United States Patent
Borden et al.

(10) Patent No.: US 6,398,960 B1
(45) Date of Patent: Jun. 4, 2002

(54) METHOD FOR REMEDIATION OF AQUIFERS

(75) Inventors: Robert C. Borden, Raleigh, NC (US); Michael D. Lee, Wilmington, DE (US)

(73) Assignees: Solutions Industrial & Environmental Services, Inc., Raleigh, NC (US); Terra Systems, Inc., Wilmington, DE (US)

( * ) Notice: Subject to any disclaimer, the term of this patent is extended or adjusted under 35 U.S.C. 154(b) by 81 days.

(21) Appl. No.: 09/702,533

(22) Filed: Oct. 31, 2000

(51) Int. Cl.$^7$ .............................. C02F 1/26; C02F 3/00
(52) U.S. Cl. .............. 210/610; 210/747; 166/296; 166/305.1; 166/310; 405/128.45; 405/128.5; 405/129.45; 435/262.5
(58) Field of Search .............. 210/610, 611, 210/747; 166/246, 305.1, 310; 405/128.45, 128.5, 128.75; 435/262.5

(56) References Cited

U.S. PATENT DOCUMENTS

| | | | |
|---|---|---|---|
| 3,628,607 A | * 12/1971 | Dietz | 166/305.1 |
| 3,846,290 A | * 11/1974 | Raymond | 210/747 |
| 4,401,569 A | * 8/1983 | Jhaveri et al. | 210/747 |
| 4,755,304 A | * 7/1988 | Hallberg et al. | 210/747 |
| 4,997,313 A | * 3/1991 | Gibson et al. | 405/128.45 |
| 5,265,674 A | 11/1993 | Frederickson et al. | 166/246 |
| 5,277,815 A | 1/1994 | Beeman | 210/605 |
| 5,531,895 A | * 7/1996 | Alford et al. | 210/747 |
| 5,554,290 A | 9/1996 | Suthersan | 210/610 |
| 5,725,470 A | * 3/1998 | Lazarowitz et al. | 210/747 |
| 5,840,571 A | 11/1998 | Beeman et al. | 435/262.5 |
| 5,888,396 A | * 3/1999 | Perriello | 210/611 |
| 5,993,660 A | * 11/1999 | Shook et al. | 210/747 |
| 6,059,973 A | * 5/2000 | Hudson et al. | 210/610 |
| 6,110,372 A | * 8/2000 | Perriello | 210/747 |
| 6,267,888 B1 | * 7/2001 | Satyanarayana | 210/610 |

OTHER PUBLICATIONS

Article entitled "Sequential Treatment Using Abiotic Reductive Dechlorination And Enhanced Bioremediation", by Susan M. Froud et al., published in Accelerated Bioremediation Using Slow Release Compounds, Selected Battelle Conference Papers 1993–1999, pp. 47–52.

Article entitled "Sequential Anaerobic/Aerobic Biodegradation Of Chlorinated Solvents: Pilot–Scale Field Demonstration", by Ronald L. Lewis et al., publsihed in Accelerated Bioremediation Using Slow Release Compounds, Selected Battelle Conference Papers 1993–1999, pp. 75–81.

(List continued on next page.)

Primary Examiner—Christopher Upton
(74) Attorney, Agent, or Firm—Olive & Olive, P.A.

(57) ABSTRACT

A method for remediating aquifers and groundwater contaminated, for example, by toxic halogenated organic compounds, certain inorganic compounds, and oxidized heavy metals and radionuclides, using the introduction of an innocuous oil, preferably an edible, food grade oil such as soybean oil, formulated into a microemulsion preferably by mixing with a natural food-grade emulsifier (such as lecithin) and water.

27 Claims, 2 Drawing Sheets-

OTHER PUBLICATIONS

Article entitled "Using Soled Peroxygen In The Bioremediation Of Chlorinated Hydrocarbons And Fuel Oxygenates", by Stephen Koenigsberg et al., published in "Accelerated Bioremediation Using Slow Release Compounds", Selected Battelle Conference Papers 1993–1999, p. 85.

Article entitled "Passively Enhanced In Situ Biodegradation Of Chlorinated Solvents", by Maureen A. Dooley, et al., published in "Accelerated Bioremediation Using Slow Release Compounds", Seleted Battelle Conference Papers 1993–1999, pp. 111–117.

Article entitled "Enhanced Bioremediation Of Chlorinated Solvents—A Single Well Pilot Study", by s. Kallur et al., published in "Acclerated Bioremediation Using Slow Release Compounds", Selected Battelle Conference Papers 1993–1999, pp. 123–126.

Article entitled "Insoluble Substrates For Reductive Dehalogenation In Permeable Reactive Barriers", by Matthew J. Zenker et al., published in "Bioremediation And Phytoremediation Of Chlorinated And Recalcirant Compounds", May 22–25, 2000, Battelle Press, pp. 47–53.

Article "Vegoil: A Novel Approach For Stimulating Reductive Dechlorination", by Kent J. Boulicault et al., published in "Bioremediation And Phytoremediation Of Chlorinated And Recalcitrant Compounds", May 22–25, 2000, Battelle Press, ppaages 1–7.

Article "Laboratory Studies Using Edible Oils To Support Reductive Dechlorination", by Michael D. Lee et al, published in Bioremediation And Phytoremediation Of Chlorinated And Recalcitrate Compounds, May 22–25, 2000, Battelle Press, pp. 77–85.

Article "A Field Demonstration Showing Enhanced Reductive Dechlorination Using Polymer Injection", by Thea T. Schuhmacher et al., published in "Bioremediation And Phytoremediation Of Chlorinated And Recalcitrate Compounds", May 22–25, 2000, Battelle Press, pp. 15–23.

Article "Time–Release Electron Donor Technology For Accelerated Biological Reductive Dechlorination", by Stephen s. Koenigsberg et al., published in "Bioremediation And Phytoremediation Of Chlorinated And Recalcitrant Compounds", May 22–25, 2000, Battelle Press, pp. 39–46.

Article entitled "Economic Considerations In Enhanced Anaerobic Biodegradation", by Mark R. Harkness, published in "Bioremediation And Phytoremediation Of Chlorinated And Recalcitrant Compounds", May 22–25, 2000, Battelle Press, pp. 9–14.

Article entitled "Ground–Water Treatment For Chlorinated Solvents", by Perry L. McCarty et al., published in "Handbook Of Bioremediation", Lewis Publishers, 1994, CRC Press, Inc, pp. 87–116.

Article entitled "A Field Evaluation Of In Situ Microbial Reductive Dehalogenation By The Biotransformation Of Chlorinated Ethenes", by R.E. Beeman et al., published in "Bioremediation Of Chlorinated And Polycyclic Aromatic Hydrocarbon Compounds", by Lewis Publishers, 1994, CRC Press, Inc., pp. 14–27.

Article entitled "Slow–Release Substrates For Transformation Of Carbon Tetrachloride By Pseudomonas Strain KC", by Michael J. Dybas et al., published in In Situ And On–Site Bioremediation: vol. 3, Apr. 28–May 1, 1997, Battelle Press, p. 59.

Article entitled "Microbial–Mediated Reduction Of Perchlorate In Groundwater", by David C. Herman et al., published in "Journal Of Environmental Quality", 27:750–754 (1998).

Article entitled "Scale–Up Issues For In Situ Anaerobic Tetrachloreathene Bioremediation", by M. D. Lee et al., published in "Journal Of Industrial Microbiology & Biotechnology", (1997) 18, pp. 106–115.

Article entitled "The Anaerobic Microbiology And Biotreatment Of Chlorinated Ethenes", by Christof Holliger, published in "Environmental Biotechnology", (1995) 6:347–351.

* cited by examiner

METHOD FOR REMEDIATION OF AQUIFERS

GOVERNMENT LICENSE RIGHTS

The U.S. Government has a paid-up license in this invention and the right in limited circumstances to require the patent owner to license others on reasonable terms as provided for by the terms of contract F41624-99-C-8033 awarded by the United States Air Force Materiel Command.

BACKGROUND OF THE INVENTION

1. Field of the Invention

This invention relates to the remediation of contaminated groundwater, and in particular, relates to a remediation method utilizing a microemulsion of an innocuous oil.

2. Description of the Related Art

There are numerous techniques employed for the remediation of contaminated groundwater in aquifers. The mechanisms for cleanup may be physical, chemical or biological. A typical physical remediation method for groundwater contaminated with volatile solvents includes recovery of the contaminated water using a series of wells followed by above-ground treatment by air stripping and/or activated carbon adsorption.

The most common approach for enhancing the anaerobic conversion of organic and inorganic contaminants in the subsurface involves continuously flushing a soluble readily biodegradable substrate such as lactate or molasses through the contaminated zone. There is, however, significant capital expense associated with the installation of the required tanks, pumps, mixers, injection and pumping wells and process controls required to continuously feed a soluble easily degradable substrate. Operation and maintenance costs can be high because of the frequent clogging of injection wells and the labor required for extensive monitoring and process control.

Treatment of contaminated groundwater in situ is often a less expensive approach for groundwater remediation. In situ treatment technologies generally rely on the natural migration of contaminated groundwater to the treatment zone where the transformation can occur via either chemical or biological mechanisms. Most previous in situ bioremediation approaches have also relied on the injection of oxygen or oxygen-containing chemicals into the aquifer to provide electron acceptors to enhance aerobic biodegradation processes, however, this approach is not applicable to chlorinated solvents and other oxidized compounds.

In many aquifers, the cleanup rate is controlled by the rate of contaminant dissolution and transport by the mobile groundwater. When dense non-aqueous phase liquids such as halogenated aliphatic organic solvents are present or contaminants are present in lower permeable zones, dissolution rates are slow and a long time is required for aquifer cleanup. Under these conditions high operation and maintenance costs are a major problem.

Impermeable barriers are used to restrict the movement of contaminant plumes in ground water. Such barriers are typically constructed of highly impermeable emplacements of materials such as grouts, slurries, or sheet pilings to form a subsurface wall. When successful, these barriers eliminate the possibility that a contaminant plume can move toward and endanger sensitive receptors such as drinking water wells or discharge into surface waters. However contaminated groundwater often bypasses around these barriers unless they are constructed to completely enclose the contamination source.

Technologies to improve the chances that contaminated groundwater will encounter subsurface reactive agents have been developed. One such technique is the permeable reactive barrier (PRB), which is a passive in situ treatment zone of reactive material that degrades or immobilizes contaminants as groundwater flows though it. In contrast to subsurface walls, permeable reactive barrier walls do not constrain plume migration, but act as preferential conduits for contaminated groundwater flow. In a PRB, reactive materials are placed where a contaminant plume must move through it as it flows, with treated water exiting on the other side.

PRBs are installed as permanent or semi-permanent replaceable units across the flow path of a contaminant plume. Natural gradients transport contaminants through strategically placed treatment media. The media degrade, sorb, precipitate or remove chlorinated solvents, metals, radionuclides, and other pollutants. These barriers may contain reactants for degrading volatile organics, chelators for immobilizing metals, nutrients and oxygen to enhance bioremediation, or other agents.

The choice of reactive media for PRBs is based on the specific organic or inorganic contaminants to be remediated. Most PRBs installed to date use zero-valent iron ($Fe^0$) as the reactive media for converting contaminants to non-toxic or immobile species. For example, $Fe^0$ (can reductively dehalogenate hydrocarbons, such as by converting TCE to ethene, and can reductively precipitate anions and oxyanions, such as by converting soluble $Cr^{+6}$ oxides to insoluble $Cr^{+3}$ hydroxides. These barriers consist of a long trench constructed perpendicular to the groundwater flow that is backfilled with ground-up iron. As the chlorinated solvent and other contaminants flow through the barrier, they react with the iron and are transformed. The transformation reactions that take place in the barriers are dependent on parameters such as pH, oxidation/reduction potential, concentrations of the substrate(s) and contaminant(s) and reaction kinetics within the barrier. The hydrogeologic setting at the site is also critical, because geologic materials must be relatively conductive and a relatively shallow aquitard must be present to contain the system. The technology works well but is very expensive to construct. Examples include the work of Gillham et al. (1995, unpublished Communication to the International Containment Technology Workshop, Permeable Barriers Session, Baltimore, Md.). The disclosures of all patents and publications referred to herein are incorporated herein by reference.

Most PRBs are installed in one of two basic configurations: funnel-and-gate or continuous trench, although other techniques using hydrofracturing and driving mandrels are also used. The funnel-and-gate system employs impermeable walls to direct the contaminant plume through a gate, or treatment zone, containing the reactive media. A continuous trench may also be installed across the entire path of the plume and is filled with reactive media.

Pump-and-treat technologies and funnel and gate barriers are not conducive to broad site cleanup. These are interceptor technologies; there are no cost-effective technologies that address the entirety of the plume in situ.

Remediation techniques that have been employed for various contaminants are discussed more specifically below. Enhanced anaerobic bioremediation through reductive dehalogenation of halogenated aliphatic organic and inorganic compounds has been demonstrated as a method for remediating aquifers contaminated with chlorinated solvents (Holliger, 1995. Current Opinion in Biotechnol. 6:347–51;

Beeman et al., 1994. In Bioremediation of Chlorinated and Polycyclic Aromatic Hydrocarbon Compounds, ed. Hinchee, et al., S K Ong, p. 14–27. Boca Raton: Lewis Publishers Ellis et al., 2000. Environmental Science and Technology. 34: 2254–2260). In this process an organic substrate is emplaced into the aquifer to stimulate the growth of anaerobic dechlorinating bacteria by providing an electron donor for energy generation and carbon source for cell growth (Lee et al., 1997. J. Ind. Microbiol. Biotechnol. 18(2/3):106–15; McCarty et al., 1994. Handbook of Bioremediation, Lewis Pub., Boca Raton, Fla., pp. 87–116). For example, tetrachloroethene (PCE) and trichloroethene (TCE) can be treated by the following reaction:

PCE->TCE->cis DCE >VC->ethene

Cis-dichloroethene (cis-DCE) and vinyl chloride (VC) are produced as intermediate compounds by this reaction. However, when a suitable microbial population is present, cis-DCE and VC are completely degraded to the non-toxic end product ethene.

Perchlorate can be biodegraded to chloride under anaerobic conditions through the sequence:

$ClO_4^-$(perchlorate)→$ClO_3^-$(chlorate)→$ClO_2^-$(chlorite)→$Cl^-$(chloride)

This process requires the addition of an organic substrate to remove dissolved oxygen, which can inhibit this process, and provide reducing equivalents to drive the reaction. (Herman et al., 1998. Journal of Environmental Quality, 27: 750–754). Studies on perchlorate degradation are primarily laboratory scale. Full-scale applications have been limited to treatment of wastewaters generated from handling rocket propellants in industrial situations.

A variety of inorganic compounds including chromium (Cr), uranium (U) and technetium (Tc) are more mobile in subsurface environments in a more oxidized state. By promoting anaerobic, reducing conditions, these compounds can be converted to a more reduced, less mobile state that will promote their immobilization. For example, chromium commonly occurs in two oxidation states in the environment: Cr[III] and Cr[VI]. The oxidized form, Cr[VI], is relatively mobile in the subsurface existing in solution as the $HCrO_4^-$ and $CrO_4^{-2}$ ions. The reduced form, Cr[III], is essentially immobile in ground water. Cr[III] may be removed from solution as an amorphous precipitate ($Cr(OH)_3$) or as a solid solution with other metal oxides and hydroxides ($Fe(OH)_3$) (Palmer et al., 1994, Natural Attenuation of Chromium in Groundwater and Soils, EPA Ground Water Issue, EPA/540/5-94/505). Studies on reductive immobilization of heavy metals and radionuclides are primarily laboratory scale.

The patent of Suthersan (U.S. Pat. No. 5,554,290) utilizes an in situ anaerobic reactive zone for in situ precipitation and filtering out of dissolved heavy metals as metallic sulfides, and microbial denitrification to degrade nitrate to nitrogen gas. Although dithionite has also been injected into wells to react with contaminants and precipitate in place, use of dithionite is less attractive due to its toxicity and cost.

Examples of bioremediation using soluble substrates include the accelerated anaerobic pilot test (AAPT) conducted by the Remediation Technologies Development Forum (RTDF), the hydrogen releasing compound (HRC®) and work with molasses. The AAPT evaluated the effectiveness of injecting lactate dissolved in water into the aquifer for establishing the reducing conditions necessary for the reductive dechlorination of TCE and cis-DCE to ethene. The treatment was performed using a closed-loop approach, which included three up-gradient injection wells and three down-gradient recovery wells. Recovered groundwater was amended with lactate and re-injected into the up-gradient wells, thus closing the loop. Lactate is a soluble readily biodegradable substrate. The results of this study were that lactate could effectively promote anaerobic dehalogenation of the chlorinated solvents to non-toxic end products, but lactate addition resulted in biofouling of subsurface equipment.

HRC® is a commercially available lactate-based polymer material with a glycerol coating formulated and sold by Regenesis, Inc. (San Clemente, Calif.). It is reported to offer long-term availability of lactate (electron donor) to the aquifer via a time-release mechanism. In the subsurface, HRC® slowly hydrolyzes, releasing dissolved lactate that travels out into the aquifer enhancing reductive dehalogenation.

Molasses has been used for bioremediation studies because of its ready availability, inexpensive cost. and rapid biodegradability. When molasses was introduced into the aquifer as an electron donor via an infiltration gallery that was dug to a depth immediately above the shallow groundwater table at a site in Lumberton, N.C., some biofouling was evidenced within one month of startup.

An early description of the use of insoluble oils in reductive dehalogenation is by Dybas et al. (1997, In Situ and On Site Bioremediation 3.59, Papers from the 4th Int. In Situ and On Site Bioremediation Symp., New Orleans, La.). Examples of bioremediation using insoluble substrates include work with soybean oil by Parsons Engineering Science (PES) (Denver, Colo.) and at an industrial site in Hamilton, N.C. Work by PES at Defense Depot Hill Utah, DDHU and at the Department of Energy Facility (DOE, Pinnellas, Fla.) employs the direct injection of soybean oil in a field demonstration. In each study, one injection well was injected with excess soybean oil. The effects of the introduction of oil were monitored in a set of down-gradient monitor wells. Results in the two studies indicate the initial absorption of the chlorinated solvents into the oil, followed by slow dissolution of the solvents back into the groundwater and their subsequent reductive dechlorination. At the Hamilton, N.C. site, a full-scale oil injection was performed by Solutions Industrial & Environmental Services, Inc. (Raleigh, N.C.), with approximately 200 injection points that were located throughout the chlorinated solvent plume. Each injection point was injected with liquid soybean oil and the temporary injection well was removed.

The patent of Frederickson et al. (U.S. Pat. No. 5,265,674) discloses treatment of aquifers using an oil, such as vegetable oil or mineral oil, which is chosen to be less dense than water, so that the oil rises through the water and contaminant plume. In this method, reliance is placed on partitioning of the contaminant in, and rising with, the rising oil. In this work, mineral oil was preferred because of its slower biodegradation rate.

It is an object of the invention to provide a safe, low-cost, effective method of bioremediation of aquifers using emulsified oil in the form of an oil microemulsion. The method of the invention enhances a wide variety of anaerobic biodegradation processes in the subsurface by providing a biodegradable, immobile organic substrate. Emulsified food-grade insoluble oil is an inexpensive electron donor source. In the aquifer, the emulsion of the invention can provide for a naturally coupled metabolic reaction between oil-degrading microorganisms and dehalorespiring microorganisms. Using emulsified oil according to the invention allows for improved distribution of the oil laterally away from the injection points and entrainment of the oil microdroplets into the effective pore space of the aquifer material. In addition, the method of the invention may be implemented in a variety of configurations, including PRB and broad area coverage.

Use of emulsified oil for in situ degradation of halogenated organic compounds and perchlorate and for reductive immobilization of other contaminants is a one-time activity. The naturally slow rate of substrate dissolution and biodegradation establishes a naturally occurring time-release mechanism so that only the amount of substrate is used that will result in the desired biodegradation. Little substrate is "wasted" by non-specific biodegradation processes. The improved method of distribution allows the process to be implemented in a variety of configurations including PRB and broad area coverage. The use of vertical injection wells offers the advantage of being able to place the oil emulsion in desired strata, or throughout the entire depth as desired.

Other objects and advantages will be more fully apparent from the following disclosure and appended claims.

SUMMARY OF THE INVENTION

The invention herein is a method for remediating aquifers and groundwater contaminated, for example, by toxic halogenated organic compounds, certain halogenated inorganic compounds, and oxidized heavy metals and radionuclides, using the introduction of an innocuous oil, preferably an edible, food-grade oil, preferably formulated into a microemulsion by mixing with one or more natural food-grade emulsifiers (such as lecithin) and water. The invention provides a specific, time-release method of bioremediation. Pretreatment of the aquifer increases mobility of the emulsion through the aquifer.

BRIEF DESCRIPTION OF THE DRAWINGS

In the Figure, a circled "X" shows a monitor well, a solid circle shows a substrate injection point, and a half-solid circle shows a gas monitoring point. An identifying code is associated with each well and point.

DETAILED DESCRIPTION OF THE INVENTION AND PREFERRED EMBODIMENTS THEREOF

The present invention provides a method for remediating aquifers contaminated by a variety of different contaminants. The method of the invention typically comprises. a site evaluation, pretreatment, treatment and post-treatment as discussed herein and in the examples.

There are three main types of bioremediation processes that may be accomplished with the invention herein: 1) dehalogenation of halogenated organic compounds; 2) anaerobic biodegradation of inorganic contaminants including reduction of nitrates, sulfates, and perchlorates; and 3) anaerobic immobilization of soluble compounds to form insoluble compounds. In the first instance, the invention herein is a process by which the anaerobic reductive dehalogenation of toxic halogenated organic compounds is promoted by the addition of a food-grade, slowly soluble, emulsified oil substrate into the aquifer. In the invention, the biodegradable, slowly soluble oil provides both carbon substrate and electron donor to stimulate the growth of natural and/or introduced populations of microorganisms. This metabolism results in creation of anaerobic subsurface conditions that promote the activity of secondary indigenous or amended populations of anaerobic dehalogenating bacteria. The metabolic process is known as reductive dehalogenation. The organisms degrade the toxic organic compounds contained in the groundwater as the groundwater moves through the aquifer. The result of the process is the biological transformation of the toxic halogenated organic compounds into non-toxic non-halogenated end products.

Chlorinated aliphatic compounds that may be biologically transformed by this process include tetrachloroethene (PCE), trichloroethene (TCE), cis & trans-dichloroethene (DCE), vinyl chloride (VC), 1,1,1-trichloroethane (TCA), 1,1- and 1,2-dichloroethane (DCA), chloroethane (CA), carbon tetrachloride (CTC), chloroform (CF), methylene chloride (DCM) and related solvents and degradation products containing halogens including chlorine, fluorine, bromine and iodine. Chlorinated aromatic compounds that may be biologically transformed by this process include chlorinated benzenes, chlorinated phenols, chlorinated biphenyls and related compounds and degradation products. The result of the process is the formation of non-toxic metabolic end products or metabolic products that may be more easily degraded through aerobic biological processes or physical-chemical processes.

An example of the anaerobic processes utilized with the invention is the microbially mediated degradation of perchlorate ($ClO_4^-$), chlorate ($ClO_3^-$), and chlorite ($ClO_2^-$) in groundwater, which is promoted by the addition of a food-grade, slowly soluble, emulsified oil substrate into the aquifer. The result of the process is the reduction of the contaminants yielding chloride ($Cl^-$) and oxygen.

The invention enables the immobilizing of oxidized metals and radionuclides by promoting anaerobic, reducing conditions through the addition of a food-grade, slowly soluble, emulsified oil substrate into the aquifer. Compounds that may be immobilized through this process include chromium (Cr), uranium (U) and technetium (Tc), as well as other materials that may be immobilized by converting them from a more oxidized condition to a more reduced condition.

In particular, the preferred method of the invention comprises the steps of 1) evaluation of a selected site that is to be bioremediated; 2) pretreatment of the site to increase mobility of treatment materials through the site; 3) treatment of the site; 4) post-treatment of the site; and 5) monitoring and evaluation of the site after treatment.

Site Evaluation. Site evaluation includes determination of the type and amount of undesirable contaminant in the area of the aquifer, such as halogenated aliphatic or aromatic organic compounds which are halorespired by the microorganisms (e.g., compounds containing chlorine, bromine, iodine or fluorine); inorganic compounds that may be degraded through anaerobic processes (e.g., compounds containing nitrate; sulfate or perchlorate); and soluble compounds that may be anaerobically immobilized to an insoluble form (e.g., compounds containing chromium, uranium, or technetium). Anaerobic immobilization using the invention may be increased in some instances by the addition of sulfate. to yield a sulfide precipitate according to the patent of Suthersan (discussed above). For each of these types of contaminants, the bacteria enzymatically use an edible oil as an electron donor with the contaminant, such as a chlorinated solvent as the electron acceptor, to release energy.

Additional site evaluation may include obtaining samples of the groundwater and soil from the aquifer, to which one or more oils are added, followed by measurement of. the loss of contaminant and the biodegradation of the oil with time (e.g., 6 months). Similarly, different forms of the same oil (e.g., liquid or semi-solid) may be tested in parallel samples from the aquifer. With increased experience with a particular type of aquifer, qualitative judgments may allow a reduction in the amount of preliminary evaluation that is necessary.

Site evaluation may also include preliminary placement of a small number of treatment points at the actual site, such as 3–4 points in a row or barrier, followed by some portion or all of the actual pretreatment, treatment and post-treatment at the limited site, with follow-up analysis for six months or so to see if groundwater down-gradient of the barrier has been remediated.

Pretreatment. The process of the invention preferably includes the pretreatment of certain portions of the aquifer with chemical agents to reduce the sorption, and/or entrapment of the oil-emulsifier droplets by the aquifer material. Typically the pretreatment agent is an emulsifier, for example, lecithin, as might be later used in the treatment step, or a calcium, sodium or phosphate salt which are added in order to fill or saturate the soil surfaces so that the later oil-emulsion treatment flows better through the aquifer. The selected chemical pretreatment agent(s) may be injected first to improve distribution of the oil in aquifer followed by the oil emulsion, and then water or additional treatment solution to distribute the oil. Pretreating a portion of the aquifer as discussed herein allows the identification of the zone within the aquifer into which the oil emulsion is injected and a means for injecting the emulsion, with or without pressure, to optimize the distribution of the oil emulsion away from the injection points. In a typical pretreatment of the invention, the emulsifier is introduced into the aquifer via vertically installed temporary or permanent wells. In this manner, oil emulsion may later be injected to blanket the entire saturated thickness of the aquifer, or to reside in a given stratum.

The pretreatment volume of the substances added to the aquifer and the emulsifier concentration are preferably selected based on computer modeling of the injection process. The primary parameters controlling this are: (1) injection well spacing; (2) vertical variation in aquifer permeability; (3) aquifer dispersivity; (4) adsorption isotherm of emulsifier to the aquifer matrix; and (5) oil-in-water emulsion volume. Vertical variations in aquifer permeability are estimated based on lithologic descriptions of the aquifer material. The dispersion coefficient can be estimated from previously published reports of aquifer dispersivity (see Bedient et al., 1999. Ground Water Contamination—Transport and Remediation, 2nd Ed., Prentice Hall, Upper Saddle River, N.J.; Domenico et al., 1998. Physical and Chemical Hydrogeology, 2nd Ed., John Wiley & Sons, New York. The adsorption isotherm of emulsifier to the aquifer matrix can be estimated by mixing a emulsifier solution of known concentration with aquifer solids, allowing the solution to equilibrate and measuring the new emulsifier concentration in solution. Replicate samples at several different emulsifier concentrations are preferably run to develop reliable information: The above-cited references also provide more detailed descriptions of the procedure as known in the art for measuring the adsorption isotherm.

Other materials may be added to the pretreatment solutions to reduce the adsorption of the emulsifying agent and/or enhance the mobility of the oil-in-water emulsion including cations ($Ca^{++}$, $Na^+$, $NH_4^+$), anions ($Cl^-$, $PO_4^=$) and other chemical agents (lecithin, polyphosphate and other available food-grade materials).

When pretreatment comprises use of emulsified oils, the considerations and methodology are as discussed below for the treatment phase.

Treatment. The invention utilizes the introduction of one or more edible, food-grade innocuous oils formulated into a microemulsion by mixing with one or more natural food-grade emulsifiers and water.

The oil used in the invention is preferably a food-grade liquid soybean oil. It is anticipated that liquid soybean oil is a satisfactory oil for use in the. invention for most aquifers to be remediated; however, semi-solid or solid soybean oil, or other oils may be found to be preferable in particular types of aquifer. Such factors as biological activity of the groundwater, methane production, and the results of lab microcosm studies will enable optimizing use of the invention in particular aquifers. Other oils usable in the invention include corn oil, canola oil, olive oil, peanut oil, coconut oil, palm oil, rape oil, fish oil, butter, and animal tallow. If there are no regulatory restrictions, non-food oils including castor oil, cottonseed oil, linseed oil, tung oil, and other mineral oils, waxes and paraffins may be used. The oils used in the invention may be modified by hydrogenation to reduce their aqueous solubility and increase their melting point, and thus may also be viscous, semi-solid, or solid. Use of alternative oils may be useful in cases where the rate of oil biodegradation is too rapid, thus excessively decreasing the operating life of the barrier. Considerations affecting selection of the oil for bioremediation at a particular site include the desirability of having an oil that: (1) is low cost; (2) is a food-grade, Generally Recognized As Safe (GRAS), non-toxic oil; (3) has low solubility so the oil is not dissolved away too quickly; (4) is sufficiently resistant to non-biological and biological degradation to persist for several years in an aquifer; (5) is sufficiently biodegradable to support the biological degradation/immobilization of the problem contaminants, and (6) is easy to handle.

The oil to be used at a particular site may be selected based on biodegradability so that it does not degrade too slowly or too rapidly. Higher molecular weight, less-soluble oils may thus be used where slower biodegradation is preferred.

The total oil volume to be used at a site is selected to provide sufficient oil to enhance the biodegradation of the contaminants and competing electron acceptors (oxygen, nitrate, sulfate, iron) that enter the barrier with some extra material remaining to allow for slow release of dissolved substrate to the groundwater. This volume is determined based on the groundwater velocity, concentration of contaminants and competing electron acceptors entering the barrier, concentration of substrate to be released from the barrier, known ratios of substrate (oil) to other compounds required for biodegradation and the proposed design life of the barrier. Preferably, at a particular site, sufficient oil is added to last for a specific amount of time, for example, five or ten years. Concentrations of contaminants and competing electron acceptors are estimated from groundwater monitoring data.

The emulsifier used in the invention is preferably non-toxic, is capable of forming stable oil-in-water emulsions under the environmental conditions present at the aquifer site, and is characterized in that its sorption and/or attachment to the aquifer material can be controlled in the environment to move through the aquifer at the desired rate. Liquid lecithin, typically used as an emulsifier in the food industry, is the preferred emulsifier and stabilizer for the oil in the invention herein. The advantages of using lecithin are that it is an accepted food-grade material known to meet regulatory requirements. Other potential emulsifiers and stabilizers include milk solids, carrageenan, guar gum, locust bean gum, karaya gum, zanthan gum, pectin, polysorbate, phosphates, and related compounds. If there are no regulatory restrictions, non-food emulsifiers may be used. Considerations for selecting the emulsifier are that it should: (1) be low cost; (2) be a food-grade, Generally Recognized As Safe (GRAS), and non-toxic emulsifier; (3) have an appropriate hydrophobic-lipophilic balance (HLB) for the oil being used; (4) produce a stabile emulsion with an average droplet size less than the mean pore size of the sediment; (5) not excessively adsorb into the aquifer sediment; (6) be more biodegradable than the oil being mobilized; and (7) be easy to handle. Selection of the correct mixer and mixing regimen also helps to ensure that the droplet size of the emulsion is correct so that the droplets of the emulsion can move through the pores between the sand grains. When the oil used in the invention is solid or semi-solid, the appropriate steps as known in the art to form an emulsion (e.g., emulsifying in hot water or providing small particles of the solid oil prior to forming the emulsion) are used to obtain the proper emulsion droplet size and characteristics.

The lecithin to oil ratio is preferably about 1:5 (range of about 1:3 to about 1:10 for typical aquifers. This ratio is selected to: (1) provide a sufficiently high lecithin concentration to stabilize the oil-in-water emulsion; (2) provide an excess of lecithin to allow for some additional adsorption of lecithin to the aquifer matrix, and (3) have suitable handling properties for work in the field (acceptable viscosity so material can be pumped and mixed with typical field equipment at the ambient field temperature).

The ratio of water to oil-lecithin mixture in the injection emulsion is selected: (1) to ensure that water is the continuous phase in the emulsion (by forming an oil-in-water emulsion, this allows the emulsion to be easily mixed with water); (2) so that the injection emulsion has an acceptable viscosity which allows easy injection, and (3) to enable distribution of the oil over a sufficiently large volume of aquifer to prevent excessive permeability loss (oil and emulsifier are always preblended to get better mixing before mixing with water). Because of the large proportion of water in the treatment fluids, the fluid flows with the water in the aquifer rather than flowing upward. Typically a minimum of 3–5 volumes of water to 1 volume of oil-lecithin mixture is used to achieve an oil-in-water emulsion. Using this ratio also results in a viscosity less than 2 centipoise, which is usually acceptable. To achieve the selected ratio of water and oil-lecithin, appropriate adjustments are made of the flow rate of the oil-lecithin mixture and the flow rate of the water into the high-speed mixer to be used to form the emulsion. The oil should also be distributed over a sufficient volume of aquifer to prevent excessive clogging of the aquifer pore spaces. The oil saturation should be a maximum of 12% of the aquifer pore spaces to prevent excessive permeability loss, however, lower saturations (1 to 5%) are desirable.

In the invention, the process of emulsifying the oil with aid of a shear mixing apparatus and injecting it under pressure assures that a stable emulsion containing micro-droplets of uniform size, such that the mean droplet size is less than the mean pore size of the aquifer to be treated at the required flow-rate and pressure for this application, can be entrained into the effective pore space in the aquifer material. This assures a greater longevity in the subsurface and reduces the likelihood that the oil will coalesce and float to the surface of the aquifer. In a typical fine sand, for example, the average pore size is approximately 1.0 micron, so the average droplet preferably has a diameter less than 1.0 micron.

Food-grade emulsified oil can be introduced into the contaminated aquifer in either of two configurations: 1) forming a permeable reactive barrier (PRB) perpendicular to the flow and transport of dissolved groundwater contamination, and 2) distributing the emulsified oil across the areal extent of the plume or source area to effect an immediate remediation throughout the aquifer.

In the invention, the one or more selected oils are introduced into the contaminated area via a series of injection points. The injection points may be installed to form a permeable reactive barrier (PRB) arranged to intercept the down-gradient movement of the contaminant(s) in the groundwater contaminant plume, to provide broad coverage of the impacted area, or to address the source area of contamination. Injection can be performed through small diameter boreholes or injection wells (temporary or permanent) emplaced into the aquifer via direct push technology such as Geoprobe® manufactured by Geoprobe Systems, Salina, Kans.) or equivalent apparatus, or via temporary or permanent injection wells installed via standard drilling methods. The decision regarding the depth of the drilling is determined, as is known in the art, from information about the vertical profile of the contamination in the aquifer. While it is desirable to screen the entire saturated thickness of the aquifer, from the soil-groundwater interface to the bottom of the aquifer, such depths may not be practical or necessary. Target depths should offer the best chance for the contaminated groundwater to come in contact with the emulsified oil.

Emplacement of the oil emulsion is preferably performed in one of several ways. The oil emulsion may be injected through the screened end of the direct push point as it is withdrawn, essentially grouting the hole with oil. Alternatively, a temporary well may be installed in a borehole. Then, the riser of one or more boreholes may be affixed with a valve to which the oil emulsion delivery apparatus can be attached. All fluids are typically injected under pressure. After pumping, the delivery hose is detached and the temporary well casing either extracted from the hole or buried in place as is known in the art. The invention herein provides a process that can address the entire groundwater plume in situ.

By using vertical injection points, the oil can be placed throughout the plume, effectively addressing all portions of the plume simultaneously.

During the injection process, injection flow rates are adjusted to ensure that there is at least 10 psi of pressure buildup in each injection well. This pressure buildup is required to achieve reasonably uniform emulsified oil distribution over the vertical interval of the injection well. Maximum injection pressures should also be controlled to prevent blowout of the well. In certain cases, it may be desirable to use very high injection pressures to enhance hydraulic fracturing of the formation and enhance oil spread. However this is a special case and needs to be closely controlled.

Also, during pretreatment or treatment, if the environmental conditions in the immediate vicinity of the barrier are not optimum for the desired rate of biodegradation to occur, other chemical agents as are known in the art may be added to the injection stream (oil or water) to change the conditions in the subsurface to make them closer to optimum.

Post-treatment. Following injection of the oil-in-water emulsion, a post-treatment pulse of emulsifier, such as lecithin, in water solution is fed into the wells to reduce mixing of the oil-in-water emulsion with plain water and to displace more of the oil away from the injection well. Typically, post-treatment comprises the addition of emulsifier, followed by addition of water to the aquifer. The post-treatment emulsifier (e.g., lecithin) concentration is selected to match the ratio of lecithin to water in the oil-in-water emulsion. The post-treatment volume is selected based on computer modeling of the injection process to minimize mixing of the emulsion with plain water. The primary parameters controlling this are: (1) injection well spacing; (2) vertical variation in aquifer permeability; (3) aquifer dispersivity; (4) adsorption isotherm of lecithin to the aquifer matrix; and (5) oil-in-water emulsion volume.

Monitoring and Evaluation. To determine that a barrier is performing as desired, evidence of good performance is obtained. Such evidence typically includes data indicating that: (1) the contaminants are degraded to required levels; (2) there is little bypassing of contaminants around barrier; (3) the permeability changes in the aquifer surrounding the injection wells are within acceptable ranges; and (4) there are acceptable rates of substrate depletion in the barrier. Substrate depletion rates can be estimated based on the concentrations of contaminants, competing electron acceptors, and electron donors entering and being released from the barrier. If monitoring results are different than those used in the original design calculations, then the design may be modified prior to fill-scale implementation.

After injection of the oil emulsion has been completed, the "invention" works without further operation and maintenance. The oil emulsion slowly dissolves as a time-release electron donor, thus stimulating indigenous microbial activity in the subsurface.

The features of the present invention will be more clearly understood by reference to the following examples, which are not to be construed as limiting the invention.

EXAMPLES

Example 1

Preliminary Studies

Preliminary biodegradability screening studies were first conducted to evaluate edible oils (liquid soybean oil and semi-solid soybean oil, as compared to molasses) for their potential use in a biologically active barrier system. Laboratory microcosm experiments showed that reductive dehalogenation was most rapid in the microcosms amended with semi-solid soybean oil. TCE and DCE were reduced to below detection within two months with concurrent production of vinyl chloride and ethene. After 130 days of incubation, vinyl chloride in the headspace was reduced to near the analytical detection limit with essentially complete conversion of TCE to ethene. Molasses and liquid soybean oil also stimulated reductive dehalogenation; however ethene production was slower than for the semi-solid soybean oil.

Example 2

Pilot Test

An extensive pilot test of this process is being conducted in a chlorinated solvent plume at Dover Air Force Base near Dover, Del. The primary contaminants at this site include tetrachloroethene (PCE), trichloroethene (TCE) and dichloroethene (DCE). Two different barrier configurations are being evaluated: 1) injection of liquid soybean oil in closely spaced wells; and 2) injection of a soybean and lecithin oil-in-water emulsion in moderately spaced wells (see FIG. 1).Each barrier is constructed with 1-inch diameter continuously screened direct push wells.

Figure 1:
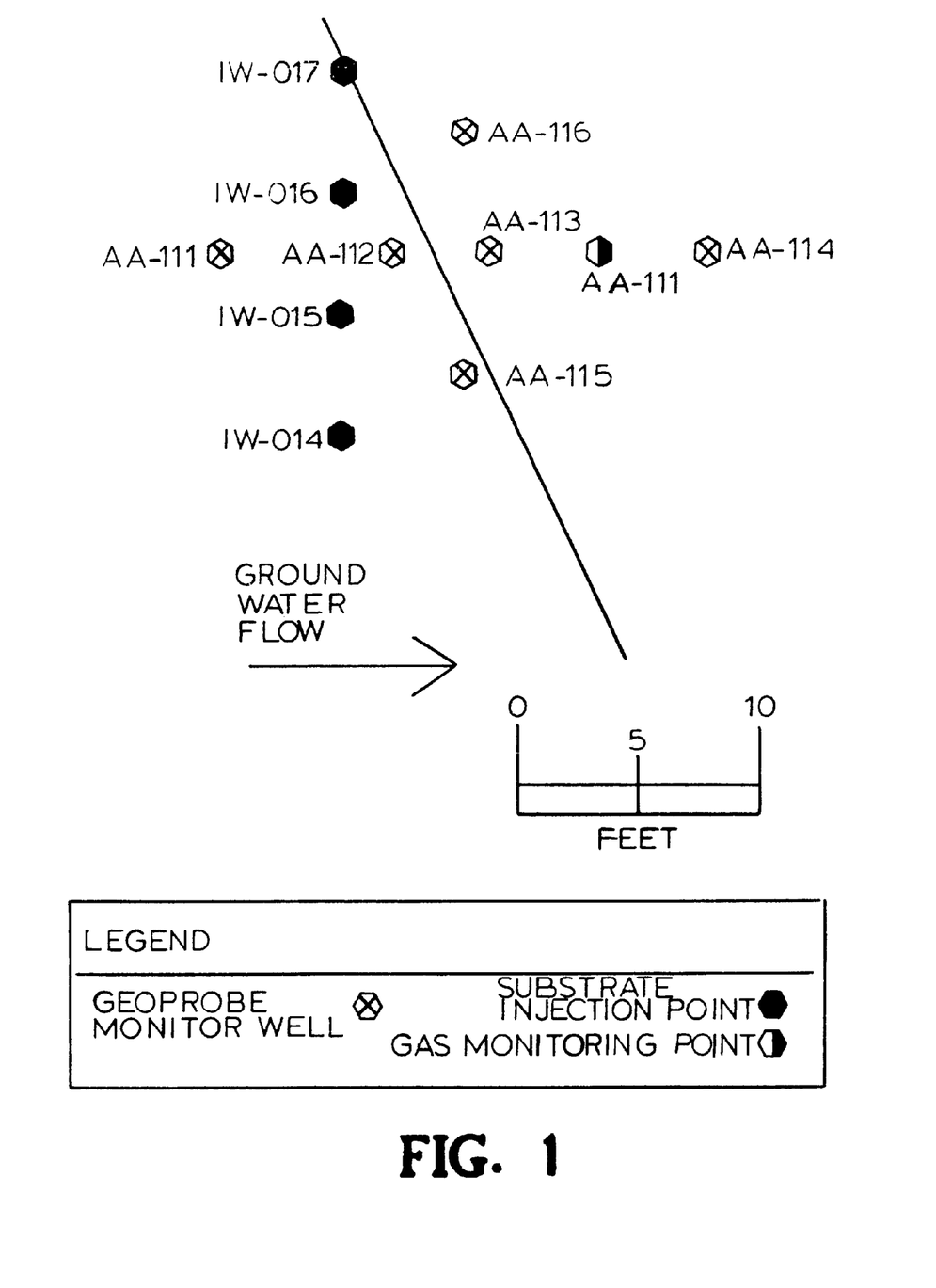
FIG. 1 shows the emulsified oil barrier configuration in Example 2. Substrate injection points are one inch diameter slotted PVC wells that are screened from 10 to 43 feet below grade. Monitoring wells are located up-gradient and down-gradient of the barrier to evaluate the effects of the emulsified oil barrier on contaminant concentrations.

In Barrier 1, about 20 gallons of liquid soybean oil were injected into each well followed by about 100 gallons of groundwater resulting in 18 to 24 inch cylindrical plugs of oil spaced 24-inches on center (OC).

In Barrier 2, a soybean oil-in-water emulsion was injected into wells spaced 5 ft. OC followed by 1,000 gallons of groundwater to distribute the oil resulting in 6 to 8 ft.-diameter cylindrical columns of treated sediment spaced 5 ft. OC. Prior to beginning the injection, a lecithin-oil mixture was prepared having a ratio of 10 gallons oil to 1 gallon lecithin. The oil-in-water emulsion was then prepared by passing a mixture of eight gallons of water per gallon of the lecithin-oil mixture through a high shear mixer to generate a microemulsion having less than 1 micron diameter droplets. Injection of 1000 gallons of the oil-in-water emulsion was followed by injection of 1000 gallons of water per well. Each well had a screen opening from 10 to 42 ft below ground surface (BGS). Monitor wells located up-gradient and down-gradient of each barrier enables evaluation of the effectiveness of each approach for distributing the oil and enhancing chlorinated solvent biodegradation.

Figure 2:
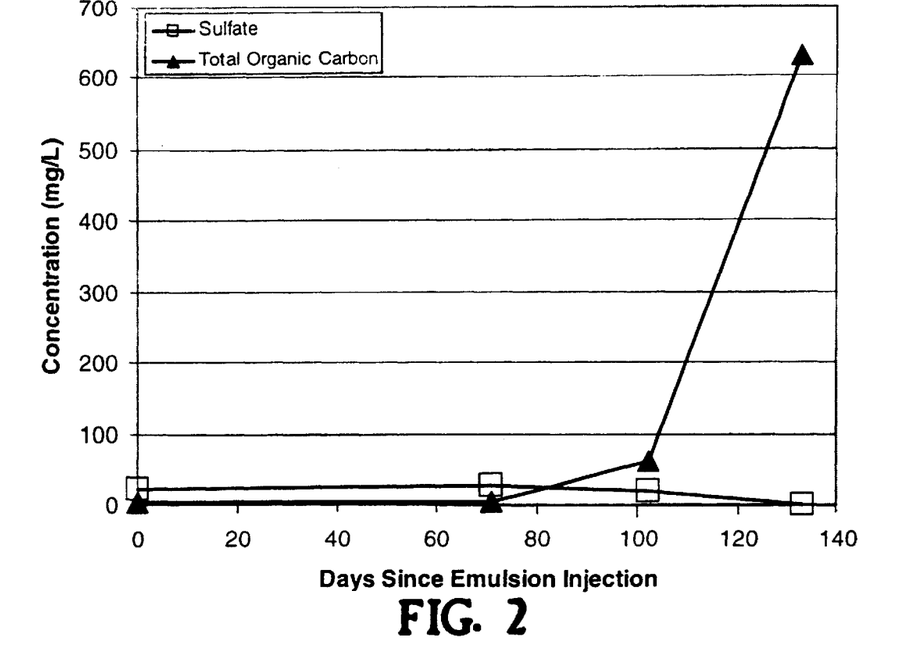
FIG. 2 shows the monitoring results for sulfate (squares) and total organic carbon (triangles) from the monitor well identified as AA-113 located directly down-gradient of the barrier in Example 2, as a function of days since emulsion injection.
Figure 3:
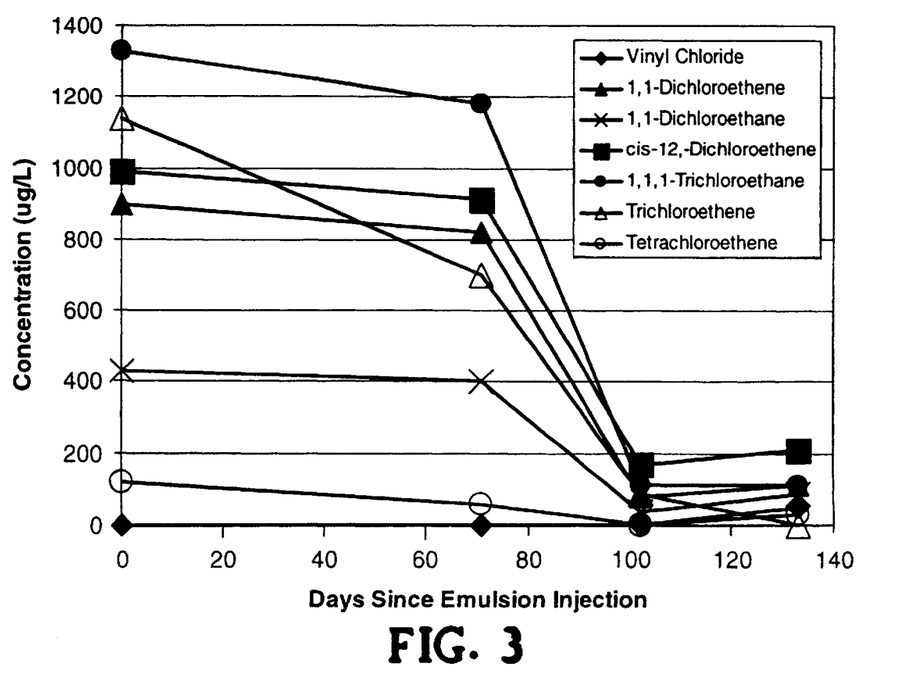
FIG. 3 shows the contaminant concentration data from monitor well AA-113 located directly down-gradient of the barrier in Example 2, as a function of days since emulsion injection. The concentration is shown of the following compounds: vinyl chloride (diamonds), 1,1-dichloroethene (solid triangles); 1,1-dichloroethane (X), cis-1,2-dichloroethene (solid squares); 1,1,1-trichloroethane (solid circles); trichloroethene (hollow triangles); and tetrachloroethene (hollow circles).

FIG. 2 shows the monitoring results from a monitor well located directly down-gradient of the barrier. Dissolved organic carbon increased dramatically down-gradient of the barrier and the competing electron acceptor sulfate declined to below the detection limit, indicating very good conditions are being achieved for anaerobic biodegradation of the chlorinated solvents. FIG. 3 shows the contaminant concentration data for the same well. The concentration of all of the higher chlorinated compounds, PCE, TCE and DCE, has declined, indicating anaerobic biodegradation is occurring. Vinyl chloride (VC) is produced as an intermediate product in this process. VC increases from below detection concentration to 51 $\mu$g/L, indicating anaerobic degradation of the other compounds is occurring. It is expected that VC will begin to decrease soon with a concurrent production of the non-toxic endproduct ethene.

Example 3

Site Remediation Process

Planning for Treatment. A food-grade edible oil is distributed at two locations at the subsurface at Edwards Air Force Base, Calif. to treat soil and groundwater contaminants utilizing the invention. At the first location, the primary contaminant is trichloroethylene (TCE). At the second site, the primary contaminant is perchlorate ($ClO_4^-$). The injection procedure is similar at the two sites. At the TCE site, the groundwater table occurs at 45 to 50 ft. below ground surface and flows down-gradient at an average groundwater velocity of 40 feet per year. The objective of this process is to construct a barrier to contaminant migration by installing a series of wells in a row generally perpendicular to the groundwater flow direction. A low solubility edible oil microemulsion is injected into the wells and distributed throughout the surrounding aquifer. Sufficient oil is distributed throughout the aquifer to enhance the biotransformation of TCE entering the barrier to the innocuous degradation product ethene through a process called reductive dehalogenation for ten years. Prior to the start of the injection project, a site characterization was completed to generally define the horizontal and vertical distribution of the contaminant plume and the chemistry of the groundwater in the vicinity of the proposed injection. In general, the groundwater has a neutral to slightly alkaline pH (7 to 8), moderate dissolved oxygen (1–4 mg/L), and high sulfate concentration (100–1000 mg/L). Sufficient emulsified oil must be distributed through the aquifer to enhance the biodegradation of the contaminants and competing electron acceptors (oxygen, nitrate, sulfate, iron) with some extra material remaining to allow for slow release of dissolved substrate to the groundwater. The actual treatment protocol is as follows.

Materials. The food-grade edible oil used is liquid soybean oil (Centrapour Salad Oil from Central Soya, Fort Wayne, Ind.). Liquid lecithin (Centrolene A from Central Soya, Fort Wayne, Ind.) is used as the emulsifier and stabilizer for the oil.

Pilot Study. As the first step in developing a barrier at this site, a six-month long pilot test is conducted. In the pilot test, four injection wells are installed 7.5 ft. apart in a line generally perpendicular to the groundwater flow direction. An oil-in-water emulsion is injected into each of these wells to distribute and immobilize a biodegradable, edible oil in a roughly 9.3 ft diameter column of aquifer surrounding each well. The 9.3 ft diameter is selected to provide a reasonable overlap from one injection well to the next. Monitoring wells are installed up-gradient and down-gradient of the barrier and are monitored periodically for the contaminants, degradation products, competing electron acceptors (oxygen, nitrate, sulfate, methane) and indicator parameters to judge the success of the project. Based on the success of the pilot study, additional wells are installed and injected to extend the barrier across the full width of the contaminant plume.

Following installation of the pilot scale barrier, a monitoring program utilizing standard techniques is conducted to ensure that the pilot scale barrier is performing as desired.

Injection Wells. Injection wells are installed with a screened interval from 45 to 65 ft below ground surface (BGS). At this location, most of the contamination is present in the region from 45 to 55 ft BGS. Because injection of the oil typically results in roughly a factor of ten reduction in aquifer permeability which could cause bypassing of the contaminants around the treatment zone, the potential impacts of contaminant bypassing are evaluated. The evaluation may be done using a series of computer models (publicly available models MODFLOW and MT3D available from the U.S. Geological Survey, Reston, Va. and the U.S. Environmental Protection Agency, Center for Subsurface Modeling Support, Ada, Okla. to simulate groundwater flow and solute transport in the vicinity of the proposed barrier. Results of these simulations indicated that the barrier would need to extend from 45 to 65 ft BGS to prevent bypassing of the contaminants. The injection equipment, tanks, mixers and associated equipment are assembled near the injection site and tested to ensure the system is operating properly.

Pretreatment. The aquifer surrounding each well is first pretreated with a lecithin-in-water solution to reduce entrapment of the subsequent oil-in-water emulsion. Liquid lecithin is fed into the high shear mixer at a ratio of 1 gallon lecithin per 17 gallons water until 630 gallons of water and 37 gallons of lecithin have been injected into each well using a predetermined pretreatment volume and lecithin concentration.

Treatment. After pretreatment, the aquifer surrounding each well is treated with the oil-in-water emulsion. Liquid lecithin is first blended with liquid soybean oil at a ratio of 1 gallon lecithin to 4.5 gallon oil. The lecithin-oil mixture is then fed into the water supply entering the high shear mixer at a ratio of 1 gallon lecithin-oil mixture per 5 gallons water until 1000 gallons of water and 200 gallons of lecithin-oil mixture have been injected into each well.

Post-treatment. To accomplish a reduction in mixing of the oil-in-water emulsion with plain water and to displace more of the oil away from the injection well, liquid lecithin is fed into the high shear mixer at a ratio of 1 gallon lecithin per 17 gallons water until 630 gallons of water and 37 gallons of lecithin have been injected into. each well. Finally, 2000 gallons of plain water are injected to displace the oil-in-water emulsion away from the injection well a sufficient distance to. (1) prevent excessive permeability loss; and (2) treat the required volume of aquifer.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A method for remediating a selected aquifer in a sediment having a mean pore size to reduce contaminants in the aquifer, comprising:
    a) evaluating the aquifer for contaminant identity and location,
    b) determining whether aquifer pretreatment should be done, and if so, pretreating the aquifer,
    c) treating the aquifer with a selected amount of an oil microemulsion having an average droplet size less than the mean pore size of the sediment,
    d) determining whether aquifer post-treatment should be done, and if so, post-treating the aquifer; and
    e) monitoring the aquifer to determine if remediation has been accomplished.

2. The method according to claim 1, wherein the contaminants in the aquifer are selected from the group consisting of halogenated organic compounds, inorganic compounds that may be degraded through anaerobic processes, and soluble compounds that may be immobilized to form insoluble compounds.

3. The method according to claim 1, wherein the oil microemulsion comprises a food-grade, slowly soluble, emulsified oil substrate.

4. The method according to claim 1, wherein the pretreatment comprises pretreatment of certain portions of the aquifer with a chemical agent selected from the group consisting of agents that reduce sorption of the oil microemulsion by the aquifer material, and agents that reduce entrapment of the oil microemulsion by the aquifer material.

5. The method according to claim 4, wherein the chemical agent is an emulsifier.

6. The method according to claim 5, wherein the emulsifier is lecithin.

7. The method according to claim 4, wherein the chemical agent is a salt selected from the group consisting of calcium, sodium and phosphate salts.

8. The method according to claim 4, wherein the pretreatment further comprises injecting an oil microemulsion, and then water, after pretreatment with the chemical agent.

9. The method according to claim 1, wherein the oil microemulsion comprises an oil selected from the group consisting of soybean oil, corn oil, canola oil, olive oil, peanut oil, coconut oil, palm oil, rape oil, fish oil, butter, and animal tallow.

10. The method according to claim 9, wherein the oil is a food-grade liquid soybean oil.

11. The method according to claim 9, wherein the oil has been modified by hydrogenation to reduce aqueous solubility and increase melting point.

12. The method according to claim 1, wherein the selected amount of the oil microemulsion is determined using groundwater velocity, concentration of contaminants and competing electron acceptors, known ratios of oil to other compounds required for biodegradation, a preferred concentration of the oil microemulsion, and a length of time for the treatment to last.

13. The method according to claim 1, wherein the oil microemulsion is formed using an emulsifier.

14. The method according to claim 13, wherein the emulsifier is non-toxic, is capable of forming stable oil-in-water microemulsions under the environmental conditions present at the aquifer site, and is characterized in that its sorption and attachment to the sediment in the aquifer can be controlled to move through the aquifer at a desired rate.

15. The method according to claim 13, wherein the emulsifier is selected from the group consisting of lecithin, milk solids, carrageenan, guar gum, locust bean gum, karaya gum, zanthan gum, pectin, polysorbate, and phosphates.

16. The method according to claim 15, wherein the emulsifier is lecithin.

17. The method according to claim 13, wherein the ratio of emulsifier to oil in the oil microemulsion is about 1:3 to 1:10.

18. The method according to claim 1, wherein the oil microemulsion is mixed with water.

19. The method according to claim 18, wherein the ratio of oil microemulsion to water is about 1:3 to 1:10.

20. The method according to claim 1, wherein the aquifer is treated using a permeable reactive barrier perpendicular to flow and transport of dissolved groundwater contamination in the aquifer.

21. The method according to claim 20 wherein the monitoring comprises collecting data indicating that: (1) the contaminants are degraded to required levels; (2) there is little bypassing of contaminants around the barrier; (3) the permeability changes in the aquifer surrounding the injection wells are within acceptable ranges; and (4) there are acceptable rates of substrate depletion in the barrier.

22. The method according to claim 1, wherein the contaminant is from a source area and is in a plume having an areal extent, and the aquifer is treated by distributing the oil microemulsion across the areal extent of the plume or source area to effect an immediate remediation throughout the aquifer.

23. The method according to claim 1, wherein the aquifer is treated by injecting the oil microemulsion through an end of a direct push point as the push point is withdrawn, forming a borehole, using injection flow rates adjusted to ensure that there is at least 10 psi of pressure buildup in the borehole.

24. The method according to claim 1, wherein the aquifer is treated by injecting the oil microemulsion using a temporary well installed in a borehole.

25. The method according to claim 1, wherein the aquifer is treated with the oil microemulsion in injection wells using injection flow rates adjusted to ensure that there is at least 10 psi of pressure buildup in each injection well.

26. The method according to claim 1, wherein post-treatment of the aquifer comprises a post-treatment pulse of emulsifier.

27. The method according to claim 26, further comprising addition of water to the aquifer.

* * * * *